(12) United States Patent
Kato

(10) Patent No.: US 12,385,804 B2
(45) Date of Patent: Aug. 12, 2025

(54) OPTICAL APPARATUS, EVALUATION APPARATUS, EVALUATION METHOD, AND MANUFACTURING METHOD OF OPTICAL SYSTEM

(71) Applicant: CANON KABUSHIKI KAISHA, Tokyo (JP)

(72) Inventor: Seima Kato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 17/942,254

(22) Filed: Sep. 12, 2022

(65) Prior Publication Data

US 2023/0091165 A1 Mar. 23, 2023

(30) Foreign Application Priority Data

Sep. 21, 2021 (JP) ................. 2021-153672

(51) Int. Cl.
*G01M 11/02* (2006.01)
(52) U.S. Cl.
CPC .... *G01M 11/0264* (2013.01); *G01M 11/0292* (2013.01); *G01M 11/0207* (2013.01); *G01M 11/0271* (2013.01)
(58) Field of Classification Search
CPC ......... G01M 11/0264; G01M 11/0292; G01M 11/0271; G01M 11/0207
See application file for complete search history.

(56) References Cited

U.S. PATENT DOCUMENTS

| 10,942,087 B2* | 3/2021 | Dumitrescu ....... G01M 11/0221 |
| 2008/0265130 A1 | 10/2008 | Colomb |
| 2011/0063592 A1* | 3/2011 | Ezura ........................ G01J 1/04 |
| | | 355/53 |

(Continued)

FOREIGN PATENT DOCUMENTS

| JP | H05-102006 A | 4/1993 |
| JP | 2007-212620 A | 8/2007 |
| JP | 2010-099354 A | 5/2010 |

(Continued)

OTHER PUBLICATIONS

C.J.R. Sheppard; Microscopy Overview; Encyclopedia of Modern Optics, Elsevier, 2005, pp. 61-69, ISBN 9780123693952 (Year: 2005).*

(Continued)

*Primary Examiner* — Hina F Ayub
*Assistant Examiner* — Kaitlyn E Kidwell
(74) *Attorney, Agent, or Firm* — Carter, DeLuca & Farrell LLP

(57) ABSTRACT

An optical apparatus includes a first light source, a second light source, a chart, an optical system, and a light receiving system. The chart is configured to guide light emitted from the first light source to a target optical system. The optical system is configured to form a point image by using light emitted from the second light source. The light receiving system is configured to receive first light emitted from the chart via the target optical system and second light emitted from the point image via the target optical system. The first light and the second light enter different positions of the target optical system.

18 Claims, 4 Drawing Sheets

(56) References Cited

U.S. PATENT DOCUMENTS

2021/0239565 A1* 8/2021 Dahl ................ G01M 11/0264

FOREIGN PATENT DOCUMENTS

| | | |
|---|---|---|
| JP | 2012-058085 A | 3/2012 |
| JP | 2013-195349 A | 9/2013 |
| JP | 2016-212333 A | 12/2016 |
| JP | 2019-049524 A | 3/2019 |
| JP | 2019-066428 A | 4/2019 |
| WO | 2019/148200 A1 | 8/2019 |

OTHER PUBLICATIONS

Extended European Search Report issued in corresponding EP Patent Application No. 22195387.0, dated Feb. 17, 2023.
Notice of Reasons for Refusal issued by the Japanese Patent Office on Aug. 27, 2024 in corresponding JP Patent Application No. 2021-153672, with English translation.
Notice of Reasons for Refusal issued by the Japanese Patent Office on Jan. 28, 2025 in corresponding JP Patent Application No. 2021-153672, with English translation.

* cited by examiner

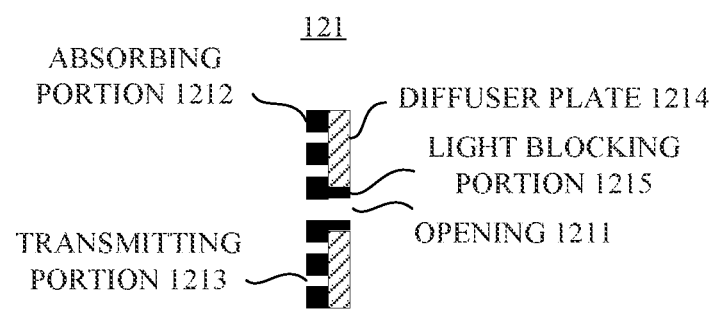
FIG. 3
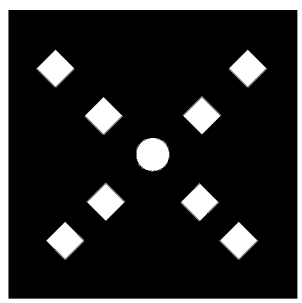 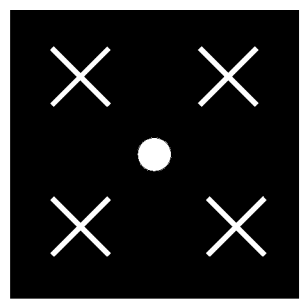 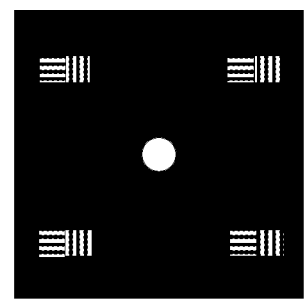
FIG. 4A　　　FIG. 4B　　　FIG. 4C

OPTICAL APPARATUS, EVALUATION APPARATUS, EVALUATION METHOD, AND MANUFACTURING METHOD OF OPTICAL SYSTEM

BACKGROUND OF THE INVENTION

Field of the Invention

The aspect of the embodiments relates to an optical apparatus, an evaluation apparatus, an evaluation method, and a manufacturing method of an optical system.

Description of the Related Art

Japanese Patent Laid-Open No. ("JP") 2007-212620 discloses a method that measures modulation transfer functions (MTF) at a plurality of image heights by using light emitted from a chart irradiated by a light source. By using this method, it is possible to acquire a one-side blur amount from MTFs and to adjust an image pickup optical system so that the one-side blur amount is reduced.

JP 2019-066428 discloses a method in which light emitted from a high-intensity point light source is transmitted through an image pickup optical system and a wavefront sensor acquires a transmitted wavefront. By using this method, it is possible to acquire basic aberrations of an image pickup optical system such as spherical aberration, coma, astigmatism, field curvature, and one-side blur from on-axis and off-axis wavefront aberrations.

The method disclosed in JP 2007-212620 can measure the MTFs at the plurality of image heights of various optical systems, but can acquire only part (one-side blur and field curvature) of aberration (optical performance). The method disclosed in JP 2019-066428 can measure on-axis and off-axis wavefront aberrations, but when the method is to perform the measurement on image pickup optical systems having different specifications such as angles of views and sensor sizes, it is necessary to change a position of the sensor and the light source.

SUMMARY OF THE INVENTION

The present disclosure provides an optical apparatus, an evaluation apparatus, an evaluation method, and a manufacturing method of an optical system each of which can easily evaluate optical performance of various optical systems.

An optical apparatus according to one aspect of the embodiments includes a first light source, a second light source, a chart, an optical system, and a light receiving system. The chart is configured to guide light emitted from the first light source to a target optical system. The optical system is configured to form a point image by using light emitted from the second light source. The light receiving system is configured to receive first light emitted from the chart via the target optical system and second light emitted from the point image via the target optical system. The first light and the second light enter different positions of the target optical system.

An evaluation apparatus according to one aspect of the embodiments includes the optical apparatus, and at least one processor or circuit. The at least one processor or circuit is configured to execute a plurality of tasks including a controlling task. The controlling task is configured to evaluate optical performance of the target optical system by using output from the light receiving system.

An evaluation method according to one aspect of the embodiments is an evaluation method for optical performance of a target optical system. The evaluation method includes irradiating a chart including a plurality of patterns by using a first light source, receiving light having been emitted from the chart and transmitted through the target optical system, calculating a frequency response characteristic of the target optical system at positions of the plurality of patterns by using the received light, shaping light emitted from a second light source different from the first light source to be a point image at a position different from the positions of the plurality of patterns, causing a wavefront sensor to receive light having been emitted from the point image and transmitted through the target optical system, and calculating wavefront aberration of the target optical system by using the light received by the wavefront sensor.

An evaluation method according to one aspect of the embodiments is an evaluation method for optical performance of a target optical system. The evaluation method includes irradiating a chart including a plurality of patterns by using a first light source, receiving light having been emitted from the chart and transmitted through the target optical system, calculating a frequency response characteristic of the target optical system at positions of the plurality of patterns by using the received light, shaping light emitted from a second light source different from the first light source to be a point image at a position different from the positions of the plurality of patterns, causing a light intensity sensor to receive, at a plurality of focus positions, light having been emitted from the point image and transmitted through the target optical system, and calculating wavefront aberration of the target optical system by using a plurality of lights received at the plurality of focus positions.

A manufacturing method according to one aspect of the embodiments is a manufacturing method of an optical system including a plurality of lenses. The manufacturing method includes manufacturing the plurality of lenses, assembling the plurality of lenses, evaluating optical performance by using one of the evaluation methods, and modifying at least part of the assembled plurality of lenses based on the evaluated optical performance.

Further features of the present invention will become apparent from the following description of exemplary embodiments with reference to the attached drawings.

BRIEF DESCRIPTION OF THE DRAWINGS

FIG. 3 is a configuration diagram illustrating a chart according to the first embodiment.

FIGS. 4A to 4C are diagrams illustrating patterns of the chart according to the first embodiment.

DESCRIPTION OF THE EMBODIMENTS

Referring now to the accompanying drawings, a description is given of embodiments according to the present disclosure.

First Embodiment

Figure 1:
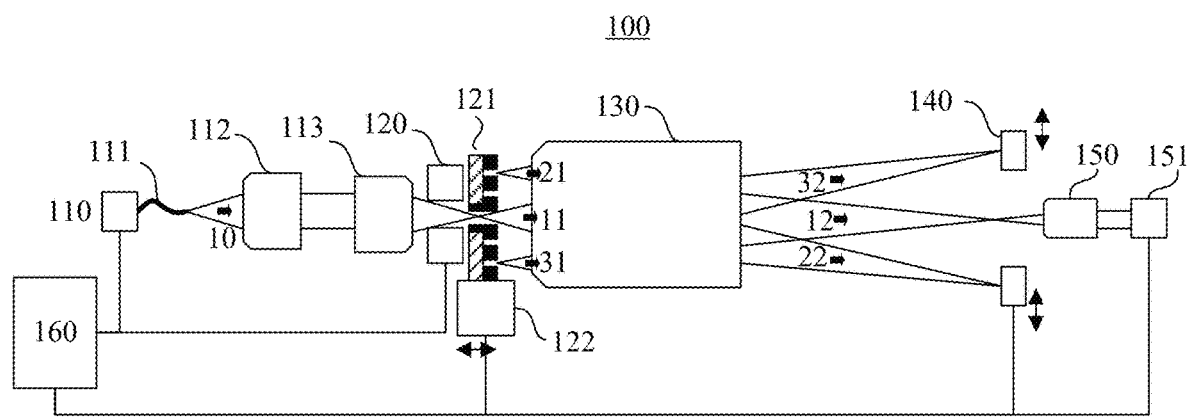
FIG. 1 is a schematic diagram illustrating an evaluation apparatus according to a first embodiment.

First, with reference to FIG. 1, a description is given of an evaluation apparatus (measuring apparatus) according to a first embodiment of the present disclosure. FIG. 1 is a schematic diagram illustrating an evaluation apparatus 100 according to this embodiment. The evaluation apparatus 100 evaluates optical performance of a target optical system, and in the evaluation apparatus 100, light emitted from a light emitting system is transmitted through the target optical system and then the light receiving system receives the light. The evaluation apparatus 100 can evaluate (measure) on-axis transmitted wavefronts and off-axis MTFs of various target optical systems.

The evaluation apparatus 100 includes a PC (controlling unit or controlling task) 160 and an optical apparatus having a light emitting system that emits light to a target lens (target optical system) 130 and a light receiving system that receives light from the target lens 130. The light emitting system includes a laser light source (second light source) 110, a fiber 111, collimator lenses 112 and 113, a ring light source (first light source) 120, a chart 121, and a stage 122. The ring light source 120 has a ring shape and has an opening through which light from the laser light source 110 is transmitted. The light receiving system includes an intensity sensor (light intensity sensor) 140, a collimator lens 150, and a Shack-Hartmann sensor (SHS) 151 as a wavefront sensor. The PC 160 controls each part of the optical apparatus. The target lens 130 is an image pickup optical system including a plurality of optical elements, and is disposed at a position such that a relationship between the chart 121 and the intensity sensor 140 is a relationship between an object and an image.

First, a description is given of a system for measuring an on-axis transmitted wavefront of the target lens 130. Light 10 emitted from the laser light source 110 via a fiber 111 is made to be parallel light by the collimator lens 112 and is focused on a focal position of the target lens 130 via the collimator lens 113. The focused light becomes diverging light 11 after becoming a simulated point light source at the focal position of the target lens 130, and enters the target lens 130. The diverging light 11 becomes a converging light 12 via the target lens 130, becomes a diverging light again after being focused, and enters the collimator lens 150. The light that is made to be approximately parallel light by the collimator lens 150 is imaged by the SHS 151. A signal acquired by the SHS 151 is calculated by the PC 160.

Figure 2:
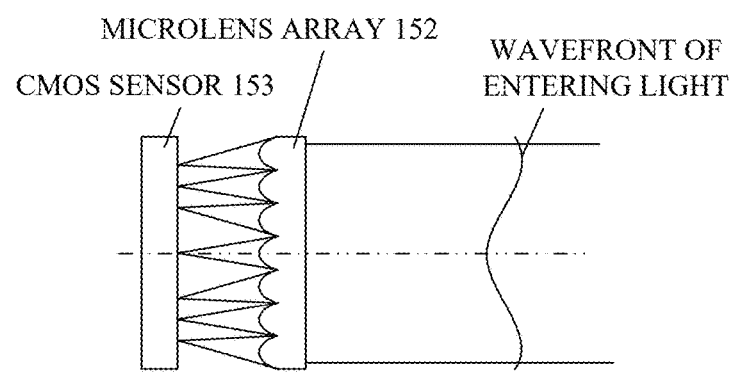
FIG. 2 is an explanatory diagram illustrating an SHS according to the first embodiment.

Next, with reference to FIG. 2, a description is given of a case where a wavefront of entering light is measured by the SHS 151. FIG. 2 is an explanatory diagram of the SHS 151, and illustrates a sectional view of the SHS 151 when the SHS 151 measures a wavefront of the entering light. The entering light is divided by a microlens array 152 in FIG. 2 and focused on a CMOS sensor 153 disposed on a rear side. The light focused on the CMOS sensor 153 is analyzed by the PC 160 illustrated in FIG. 1. Tilt of the wavefront of the entering light is calculated from a position of a center of gravity of the light-focused point, and a shape of the wavefront of the entering light is acquired by integrating or fitting data group of the tilt of the wavefront.

In order that the transmitted wavefront of the target lens 130 is accurately acquired, the wave entering the target lens 130 is made to be an ideal spherical wave emitted from a point light source having a size smaller than the following equation (1). In the equation (1), $\lambda$ represents a wavelength of the laser light source 110, and NA represents a numerical aperture of the target lens 130.

$$\sim \frac{\lambda}{NA} \tag{1}$$

Forming the point light source at the focal position of the target lens 130 requires an NA of the collimator lens 113 to he greater than the NA of the target lens 130. The laser light source 110 is a high-intensity light source capable of emitting light having a coherence that can converge into a size smaller than the size expressed by the equation (1) and having a light amount that can be measured by the SHS 151. Such a light source includes, for example, a gas laser and a semiconductor laser. Light acquired by focusing light having a high coherence with a sufficiently large NA can be regarded as a simulated point light source with respect to the target lens 130.

Next, a description is given of a system for measuring an off-axis MTF of the target lens 130. The light emitted from the ring light source 120 illustrated in FIG. 1 passes through a transmitting portion of the chart 121 and enters the target lens 130 as diverging lights 21 and 31. The diverging lights 21 and 31 become converging lights 22 and 32 after passing through the target lens 130, and the intensity sensor 140 receives them. The intensity sensor 140 can be driven by an unillustrated stage.

FIG. 3 is a configuration diagram of the chart 121. At the center of the chart 121, an opening 1211 is formed for transmitting light emitted from the laser light source 110, and the light emitted from the laser light source 110 passes through the opening 1211. An absorbing portion 1212 and a transmitting portion 1213 are provided in a peripheral part of the chart 121, and a diffuser plate 1214 is disposed on an upstream side of the transmitting portion 1213. The diffuser plate 1214 is provided to make uniform light distribution characteristics of the light emitted from the ring light source 120. Thus, in this embodiment, the chart 121 includes a plurality of transmitting portions 1213 and a plurality of absorbing portions 1212, and the point light source formed by the laser light source 110 is located at one (first transmitting portion) of the plurality of transmitting portions 1213 (opening 1211). In this embodiment, the diffuser plate 1214 is disposed between a transmitting portion (second transmitting portion) among the plurality of transmitting portions 1213 and the ring light source 120, and the point light source is not located on the transmitting portion. In this embodiment, the transmitting portion 1213 is air but is not limited to this, and a transmitting member that transmits light may be disposed. In this embodiment, the transmitting portions 1213 of the chart 121 are collectively referred to as a chart pattern or pattern.

In a case where the light emitted from the ring light source 120 overlaps the diverging light 11 from the laser light source 110, a measurement error may occur. In order that the overlap is avoided, a light blocking portion 1215 may be provided as illustrated in FIG. 3. However, this embodiment is not limited to this, and a light blocking portion may be located at a position other than a position on the chart 121, as long as the configuration can avoid the overlap between the light emitted from the ring light source 120 and the diverging light 11 from the laser light source 110. Alternatively, without the light blocking portion disposed, the PC 160 may turn off the ring light source 120 while the SHS 151 is receiving the light. As a result, both lights can be separated from each other even in a case where a light blocking portion is not provided.

FIGS. 4A to 4C are diagrams illustrating patterns of the chart 121. FIG. 4A illustrates an edge pattern, FIG. 4B illustrates a slit pattern, and FIG. 4C illustrates a grating pattern. The MTF value can be calculated from a degree of blurring of each chart image. A defocus characteristic of the MTF value can also be acquired by the stage 122 making the chart 121 defocused.

As described above, the light emitting system includes a first light emitting system that forms the light emitted from the chart 121 illuminated (irradiated) by the ring light source 120, and a second light emitting system that shapes the light emitted from the laser light source 110 to form the point light source. The intensity sensor 140 receives the light having been emitted from the first light emitting system and transmitted through the target lens 130, and the SHS 151 receives the light having been emitted from the second light emitting system and transmitted through the target lens 130.

These two types of light emitting systems enable the acquisition of the on-axis transmitted wavefront and the off-axis MTF of the target lens 130. With respect to the on-axis transmitted wavefront, for example, a wavefront shape can be decomposed into aberration components by fitting the on-axis transmitted wavefront with a Zernike polynomial. Fitted Zernike coefficients include information similar to basic aberration such as astigmatism, coma, and spherical aberration, as described in the following equations (2).

Term Z4=Defocus Component

Term Z5=Astigmatism Component at 0°-90°

Term Z6=Astigmatism Component at 45°

Term Z7=Horizontal Coma Component

Term Z8=Vertical Coma Component

Term Z9=Spherical Aberration Component     (2)

One-side blur amount of the target lens 130 can be calculated from a variation in peak positions of the off-axis MTFs, and a field curvature amount of the target lens 130 can be calculated from the peak position of the off-axis MTF and the defocus term of the Zernike polynomial. In this way, it is possible to acquire the basic aberration of the target lens 130.

Figure 5:
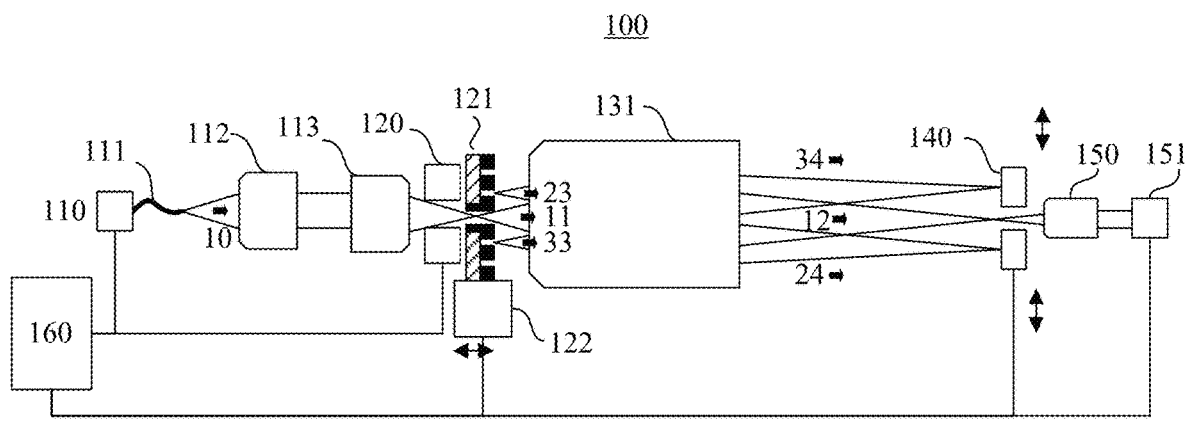
FIG. 5 is an explanatory diagram illustrating an evaluation apparatus according to the first embodiment.

Next, with reference to FIG. 5, a description is given of a case where the evaluation apparatus 100 performs a measurement on a target lens (target optical system) 131 having different optical specifications. FIG. 5 is an explanatory diagram of the evaluation apparatus 100. For example, in a case where target lenses 131 have different focal lengths, the respective distances from target lenses 131 to the intensity sensor 140 or the SHS 151 are adjusted. In a case where target lenses 131 having different angles of views are to be measured, the intensity sensor 140 is moved so that the intensity sensor 140 is located at respective positions of the angles of views calculated from respective image heights and focal lengths. In a case where MTFs of different image heights are to be measured, the intensity sensor 140 is positioned so that the intensity sensor 140 measures light emitted from patterns at different image heights, such as light 23 and 24 and light 33 and 34 in FIG. 5. In this case, the pattern of the chart 121 may be located at a plurality of image heights as illustrated in FIG. 4A so that the same chart 121 can be used when the target lenses 131 is replaced.

As described above, the optical apparatus according to this embodiment includes the first light source (ring light source 120), the chart 121 that guides the light emitted from the first light source to the target optical system (target lens 130), and the second light source (laser light source 110) that is different from the first light source. The optical apparatus also includes the optical system (fiber 111, collimator lenses 112 and 113) that forms the point image by using the light emitted from the second light source. The optical apparatus further includes the light receiving system (intensity sensor 140, SHS 151) that receives first light emitted from the chart via the target optical system and second light emitted from the point image via the target optical system. The first light and the second light enter different positions of the target optical system.

The evaluation apparatus 100 according to this embodiment includes the optical apparatus and the controlling unit (controlling task, PC 160) that evaluates the optical performance of the target optical system by using the output from the light receiving system. Here, the different positions of the target optical system are, for example, on-axis (center) and off-axis (periphery), but the laser beam does not have to be on-axis. The optical performance may be a frequency response characteristic (MTF) at a position of the chart of the first light emitting system and wavefront aberration at a position of the point light source of the second light emitting system.

The evaluation apparatus 100 includes the light intensity sensor that receives the first light and the wavefront sensor that receives the second light, and executes causing the wavefront sensor to receive the light that has been emitted from the point image and transmitted through the target optical system, and calculating the wavefront aberration of the target optical system by using the light received by the wavefront sensor. However, this embodiment is not limited to this, and the evaluation apparatus may include a light intensity sensor that receives the first light and the second light. In this case, the evaluation apparatus executes causing the light intensity sensor to receive, at a plurality of focus positions, the light that has been emitted from the point image and transmitted through the target optical system, and calculating the wavefront aberration of the target optical system by using the light received at the plurality of focus positions.

According to this embodiment, it is possible to provide an optical apparatus, an evaluation apparatus, and an evaluation method each of which can easily evaluate optical performance of various optical systems.

Second Embodiment

Figure 6:
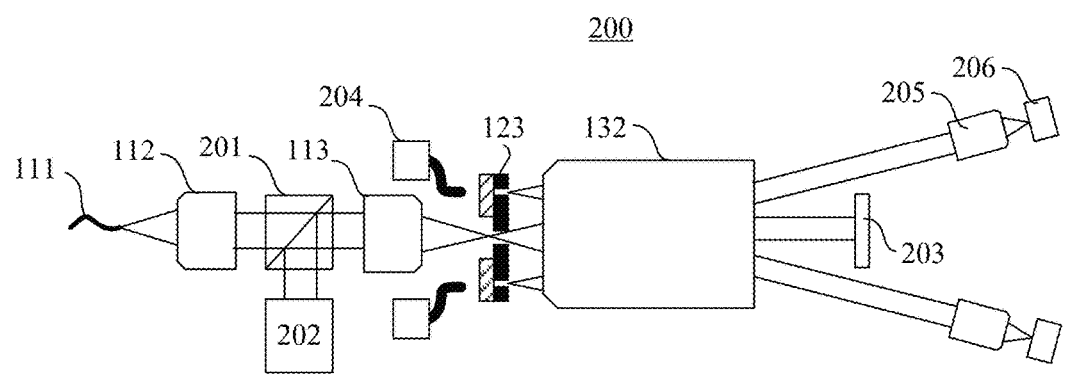
FIG. 6 is a schematic diagram illustrating an evaluation apparatus according to a second embodiment.

Next, with reference to FIG. 6, a description is given of an evaluation apparatus (measuring apparatus) according to a second embodiment of the present disclosure. FIG. 6 is a schematic diagram illustrating an evaluation apparatus 200 according to this embodiment.

The evaluation apparatus 100 includes an unillustrated PC (controlling unit, controlling task) and an optical apparatus including a light emitting system that emits light to a target lens (target optical system) 132 and a light receiving system that receives light from the target lens 132. The light emitting system includes an unillustrated laser light source (second light source), a fiber 111, collimator lenses 112 and 113, a chart 123, a beam splitter 201, a reflection mirror 203, and an LED light source (first light source) 204. The LED light source 204 includes a plurality of LEDs arranged so that an opening is formed for transmitting light emitted from the laser light source. The light receiving system includes a wavefront sensor 202, a collimator lens 205, and an intensity sensor (light intensity sensor) 206. The target lens 132 is an image pickup optical system including a plurality of optical elements, and is disposed at a position such that a relationship between the chart 123 and an object at an infinite distance are a conjugated relationship.

Light emitted from the unillustrated laser light source through the fiber 111 forms a point light source (simulated point light source) at an opening of the chart 123, as in the first embodiment. The light emitted from the simulated point light source is transmitted through the target lens 132, is reflected by a reflection mirror 203, and then is returned to the collimator lens 113 through the same path. The light returned to the collimator lens 113 is then reflected by the beam splitter 201 and acquired by the wavefront sensor 202. The wavefront sensor 202 is, for example, an SHS, but is not limited to this, and may be a shearing interferometer or a talbot interferometer.

The light emitted from the LED light source 204 illuminates (irradiate) the chart 123 via a light guide including a fiber or the like. The illumination light passes through the transmitting portion of the chart 123, passes through the target lens 130, becomes approximately parallel light, passes through the collimator lens 205, and is then received by the intensity sensor 206. The light guide may be prepared for each transmitting portion of the chart 123, or one light guide may illuminate (irradiate) a plurality of transmitting portions.

As in the chart 121, the chart 123 includes a diffuser plate located on a pattern for MTF measurement. The opening of the chart 123 does not need to be located on an optical axis, as long as the opening is located on an image plane of the target lens 132. In a case where the opening is not located on the optical axis, an exit pupil of the target lens 132 may not have a circular shape. In this case, a coefficient may be calculated for an elliptical shape using an elliptical Zernike. Alternatively, the coefficient may be acquired by using an orthogonalization function that matches a shape of the exit pupil based on a Gram-Schmitt concept.

In a case where the chart 123 has a grating pattern, the intensity sensor 206 always measures a contrast of the pattern at a specific frequency and at a specific defocus. By tilting the pattern or the intensity sensor, the defocus characteristic can be acquired in an area of the intensity sensor 206.

In the evaluation apparatus 200, in a case where the light from the LED light source 204 enters the wavefront sensor 202, an error occurs. In order that the error is reduced, a diffuser plate may be placed at a position away from the opening so that diffused light from the diffuser plate does not enter the opening. Alternatively, a light blocking portion that surrounds the optical path of the laser beam may be provided. That is, at least one of the first light emitting system and the second light emitting system may include a light blocking portion that separates the light from the first light emitting system and the light from the second light emitting system. Alternatively, the LED light source 204 may be turned off while the wavefront sensor 202 is receiving light. In a case where a light blocking portion surrounding the optical path of the laser beam is provided between the collimator lens 113 and chart 123, an outer side of the light blocking portion may be made to be a mirror surface, and the light emitted from the LED light source 204 may be reflected, which improves a light utilization efficiency.

Figure 7:
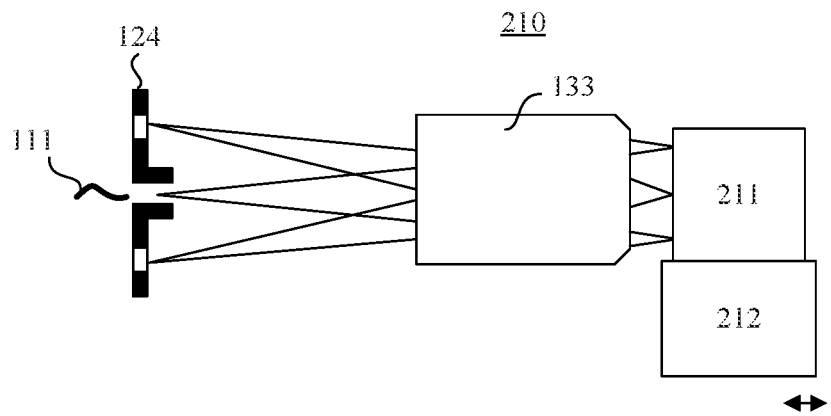
FIG. 7 is a schematic diagram illustrating an evaluation apparatus as a modification example of the second embodiment.

Next, with reference to FIG. 7, a description is given of a modification example of the evaluation apparatus according to this embodiment. FIG. 7 is a schematic diagram illustrating the evaluation apparatus 210 as a modification example of this embodiment. The evaluation apparatus 210 includes a fiber 111, a chart 124, an intensity sensor (light intensity sensor) 211, and a stage 212. A target lens 133 is an image pickup optical system including a plurality of optical elements, and is disposed at a position such that a relationship between the chart 124 and the intensity sensor 211 is a relationship between an object and an image.

The chart 124 is a black-and-white chart including an absorbing portion (black) and a scattering portion (white), and is illuminated (irradiated) by an unillustrated light source (first light source). The first light source is an illumination light source such as a fluorescent lamp. The scattered light from the pattern on the chart 124 is projected onto part of a screen of the intensity sensor 211. Light emitted from an unillustrated second light source is guided by the fiber 111 and projected onto another part of the screen of the intensity sensor 211. The intensity sensor 211 is driven in the optical axis direction by the stage 212 so that the intensity sensor 211 acquires a plurality of defocus images. Defocus characteristics of MTFs can be calculated from the defocus images of the chart pattern. A transmitted wavefront of the target lens 133 can be calculated from the defocus images of the light emitted from the fiber 111 by an optimization method.

The fiber 111 may be disposed between the chart 124 and the target lens (target optical system) 133. In this case, an absorbing portion (black) is disposed on an upstream side of the fiber 111 so that the light from the scattering portion (white) of the chart 124 does not pass through the vicinity of a light emitting position of the fiber 111 and the light emitted from the fiber 111 and the light from the scattering portion (white) do not overlap each other on the intensity sensor 211. A size D of the absorbing portion where the point image is located is determined based on an aperture size of the target lens 133 and a defocus amount of the intensity sensor 211 of the light receiving system. More specifically, the following equation (3) expresses D using a defocus amount Z of the intensity sensor 211, a numerical aperture Fno of the target lens 133, and an object distance m.

$$D = mZ/Fno \tag{3}$$

Generally, the object distance m is 10 or more. That is, the measurement is performed at an object distance m that is 10 times or more the focal length f of the target lens (target optical system) 133. A maximum value of the defocus amount Z is 0.1 Fno to 2 Fno [mm], and hence the size D of the absorbing portion may be at least 1 mm, or may be 20 mm or more.

Third Embodiment

Figure 8:
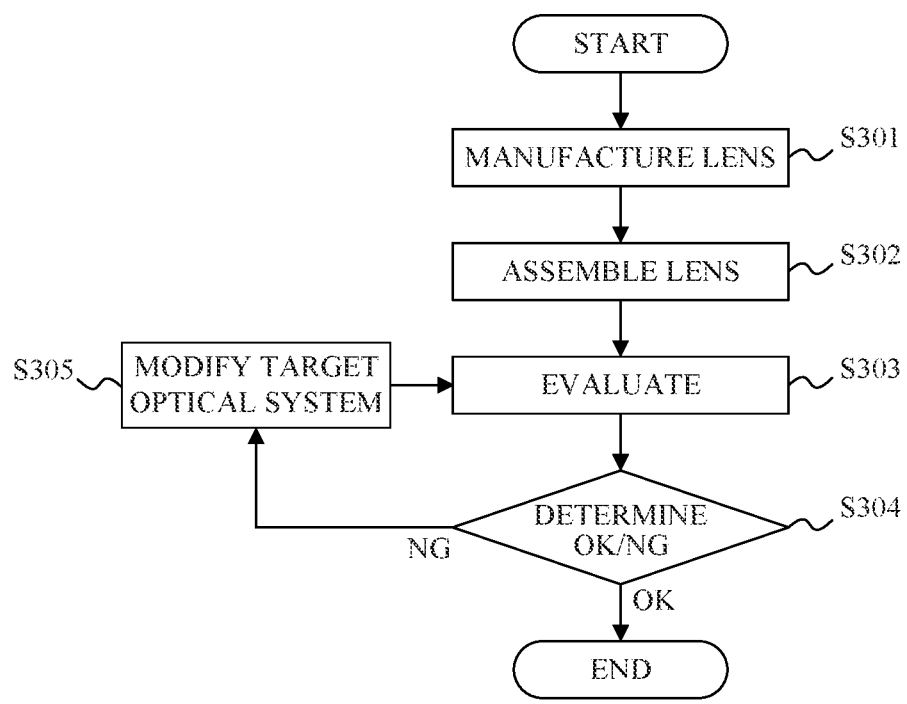
FIG. 8 is a flow chart illustrating a manufacturing method of an optical system according to a third embodiment.

Next, with reference to FIG. 8, a description is given of a manufacturing method of an optical system according to a third embodiment of the present disclosure. FIG. 8 is a flowchart illustrating the manufacturing method of the optical system according to this embodiment.

First, in step S301, a single lens is manufactured by polishing a lens (lens manufacturing process). Subsequently, in step S302, a lens unit is assembled by combining single lenses (lens assembling process). Alternatively, an image pickup optical system (target optical system) is assembled by combining a single lens(es) and/or a lens unit(s). Subsequently, in step S303, basic aberration of the image pickup optical system (target optical system) is measured and evaluated (evaluating process). Subsequently, in step S304, it is determined whether the measured value is better (OK) than a reference or not (NG). In a case of OK, this flow ends. On the other hand, in a case of NG, the image pickup optical system (target optical system) is modified (corrected) in step S305. Then, the process returns to step S303 again.

In step S305, the target optical system is modified by adjusting an adjustment point(s) provided in the target optical system. In a case where the modification (correction) cannot be completed only by adjusting the adjustment point, the target optical system is disassembled, a point other than the adjustment point is adjusted, and the target optical system is reassembled. Alternatively, a lens or some lenses of the target optical system is modified by polishing the lens. Alternatively, a defective unit or lens is replaced. By going through the above steps, a high-quality optical system can be manufactured.

According to each embodiment, it is possible to provide an optical apparatus, an evaluation apparatus, an evaluation method, and a manufacturing method of an optical system, each of which can easily evaluate the optical performance of various optical systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153672, filed on Sep. 21, 2021, which is hereby incorporated by reference herein in its entirety.

What is claimed is:

1. An optical apparatus comprising:
    a first light source and a second light source;
    a chart configured to guide light emitted from the first light source to a target optical system, the chart comprising:
        a light blocking portion surrounding an aperture, wherein the light blocking portion is disposed between the aperture and a diffuser plate, wherein the light blocking portion is configured to separate the light emitted from the first light source and light emitted from the second light source, wherein an opening is formed on the diffuser plate, and wherein the light emitted from the second light source is transmitted through the opening;
    an optical system configured to form a point image by using the light emitted from the second light source; and
    a light receiving system configured to receive first light emitted from the chart via the target optical system and second light emitted from the point image via the target optical system,
    wherein the first light and the second light enter different positions of the target optical system, and
    wherein the size of the point image is smaller than $\lambda/NA$, where NA is a numerical aperture of the light receiving system and $\lambda$ is a wavelength of the second light.

2. The optical apparatus according to claim 1, wherein the light receiving system includes:
    a light intensity sensor configured to receive the first light; and
    a wavefront sensor configured to receive the second light.

3. The optical apparatus according to claim 1, wherein the light receiving system includes a light intensity sensor configured to receive the first light and the second light.

4. The optical apparatus according to claim 1, wherein the chart includes a plurality of scattering portions and a plurality of absorbing portions, and
    wherein the point image is located on an absorbing portion among the plurality of absorbing portions.

5. The optical apparatus according to claim 4, wherein a size of the absorbing portion on which the point image is located is determined based on an aperture size of the target optical system and a defocus amount of a light intensity sensor of the light receiving system.

6. The optical apparatus according to claim 1, wherein the chart includes a first transmitting portion and an absorbing portion, and
    wherein the point image is located on the first transmitting portion.

7. The optical apparatus according to claim 6, wherein the chart includes a second transmitting portion on which the point image is not located, and
    wherein the diffuser plate is disposed between the second transmitting portion and the first light source.

8. The optical apparatus according to claim 1, wherein the second light source is a laser light source.

9. The optical apparatus according to claim 1, wherein an opening is formed on the first light source, and
    wherein the light emitted from the second light source is transmitted through the opening formed on the first light source.

10. The optical apparatus according to claim 9, wherein the first light source is a ring light source.

11. The optical apparatus according to claim 9, wherein the first light source is an LED light source including a plurality of LEDs.

12. An evaluation apparatus comprising:
    an optical apparatus according to claim 1;
    a memory storing instructions; and
    at least one processor that executes the instructions to evaluate optical performance of the target optical system by using output from the light receiving system.

13. The evaluation apparatus according to claim 12, wherein the optical performance includes a frequency response characteristic at a position of the chart and wavefront aberration at a position of the point image.

14. The evaluation apparatus according to claim 12, wherein the at least one processor executes the instructions to turn-off the first light source while the light receiving system is receiving the second light.

15. An evaluation method for optical performance of a target optical system, the evaluation method comprising:
    irradiating a chart including a plurality of patterns by using a first light source;
    receiving light having been emitted from the chart and transmitted through the target optical system;
    calculating a frequency response characteristic of the target optical system at positions of the plurality of patterns by using the received light;
    shaping light emitted from a second light source different from the first light source to be a point image at a position different from the positions of the plurality of patterns;
    causing a wavefront sensor to receive light having been emitted from the point image and transmitted through the target optical system; and calculating wavefront aberration of the target optical system by using the light received by the wavefront sensor, wherein the size of the point image is smaller than $\lambda/NA$, where NA is a numerical aperture of a light receiving system and $\lambda$ is a wavelength of the second light, wherein the chart comprises a light blocking portion surrounding an aperture, wherein the light blocking portion is disposed between the aperture and a diffuser plate, wherein the light blocking portion is configured to separate light emitted from the first light source and the light emitted from the second light source, wherein an opening is formed on the diffuser plate, and wherein the light emitted from the second light source is transmitted through the opening.

16. An evaluation method for optical performance of a target optical system, the evaluation method comprising:

irradiating a chart including a plurality of patterns by using a first light source;

receiving light having been emitted from the chart and transmitted through the target optical system;

calculating a frequency response characteristic of the target optical system at positions of the plurality of patterns by using the received light;

shaping light emitted from a second light source different from the first light source to be a point image at a position different from the positions of the plurality of patterns;

causing a light intensity sensor to receive, at a plurality of focus positions, light having been emitted from the point image and transmitted through the target optical system; and calculating wavefront aberration of the target optical system by using a plurality of lights received at the plurality of focus positions, wherein the size of the point image is smaller than $\lambda/NA$, where NA is a numerical aperture of a light receiving system and $\lambda$ is a wavelength of the second light, wherein the chart comprises a light blocking portion surrounding an aperture, wherein the light blocking portion is disposed between the aperture and a diffuser plate, wherein the light blocking portion is configured to separate light emitted from the first light source and the light emitted from the second light source, wherein an opening is formed on the diffuser plate, and wherein the light emitted from the second light source is transmitted through the opening.

17. A manufacturing method of an optical system including a plurality of lenses, the manufacturing method comprising:

manufacturing the plurality of lenses;

assembling the plurality of lenses into the optical system;

evaluating optical performance of the optical system by using the evaluation method according to claim 15; and modifying at least part of the optical system-based on the evaluated optical performance.

18. A manufacturing method of an optical system including a plurality of lenses, the manufacturing method comprising:

manufacturing the plurality of lenses;

assembling the plurality of lenses into the optical system;

evaluating optical performance of the optical system by using the evaluation method according to claim 16; and modifying at least part of the optical system based on the evaluated optical performance.

* * * * *